A. ENGEL.
VALVE.
APPLICATION FILED OCT. 6, 1913.
1,190,530.
Patented July 11, 1916.
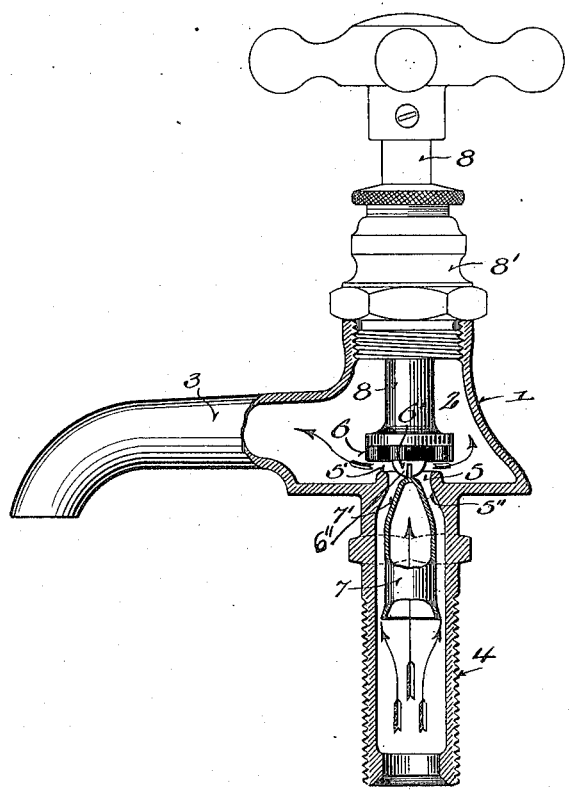

UNITED STATES PATENT OFFICE.

AUGUST ENGEL, OF MILWAUKEE, WISCONSIN, ASSIGNOR TO MILWAUKEE BRASS MANUFACTURING COMPANY, OF MILWAUKEE, WISCONSIN.

VALVE.

1,190,530.      Specification of Letters Patent.      Patented July 11, 1916.

Application filed October 6, 1913. Serial No. 793,655.

*To all whom it may concern:*

Be it known that I, AUGUST ENGEL, a citizen of the United States, and resident of Milwaukee, in the county of Milwaukee and State of Wisconsin, have invented certain new and useful Improvements in Valves; and I do hereby declare that the following is a full, clear, and exact description thereof.

My invention has for its object to provide a simple, economical and effective pressure-controlled stopper for fluid valves of any form, the same being exemplified in this instance in connection with a basin cock of the compression type.

Under ordinary conditions it is the practice to employ some type of cut-off valve remote from the cock in connection with the water-supply pipe, whereby the said supply is checked when it is desired to dismantle the cock for repairs such, for example, as renewing the valve disk facing or gland packing. This arrangement for cutting off the main supply adds more or less to the expense of installing a system and is also inconvenient. Hence my device is designed to overcome such objectionable features by reducing the cost of installation and also the labor required in cutting off the supply at a distance from the cock to be repaired, it being borne in mind that my device constitutes a part of the cock and operates in conjunction with the master valve, whereby the flow of water is checked when said master valve is moved from the range of its normal action.

With the above objects in view the invention consists in certain peculiarities of construction and combination of parts as fully set forth hereinafter with reference to the accompanying drawing and subsequently claimed.

The drawing illustrates an elevation of a valve of the cock type embodying the features of my invention, the said cock being partly broken away and in section to more clearly illustrate details of construction.

Referring by characters to the drawing, 1 represents a valve casing provided with the usual valve chamber 2, nozzle 3 and a channeled exteriorly threaded water-supply shank 4, the said channel being provided with a contracted intake mouth. The shank channel communicates with the valve chamber through the medium of a port 5 having an upper seat 5′ and lower beveled seat 5″, the said port being slightly restricted relative to the flow channel. The upper valve seat 5′ is adapted to receive a master valve having play in the chamber 2, the said valve comprising a valve disk 6, which disk is faced with the ordinary type of yieldable gasket 6′, the same being secured by a setscrew 6″ that normally extends through the port to form an engaging nipple for a pressure-controlled hollow stopper 7, constituting an auxiliary valve member. The valve-disk 6 is carried by a stem 8, the same being in threaded union with a gland 8′ that forms a cap-closure for the valve-casing 1, which structural features are of standard type and form no part of my invention. The water-supply channel of the casing shank 4 at its mouth is slightly restricted, being of such diameter as to admit the insertion of the stopper 7. The stopper is drawn out from a metallic blank in hollow shell-like form having a conically shaped closed head and an open flared bottom. After the stopper is assembled within the flow channel the walls of the same are slightly expanded at their open bottom edge, as shown, whereby said stopper is confined within the shank, the expanded end being of slightly greater diameter than the contracted mouth portion of said shank. The stopper is also provided with a conical head 7′, whereby water is permitted to readily flow over its side walls about the head and through the port 5, when the plug is held from its seat by contact with the head of the set-screw 6″, it being understood that the conical head of the plug forms a closure for the lower port seat 5″ through the influence of the water pressure when the master valve is lifted beyond its normal range of travel and said stopper head when so seated projects through the port into the valve chamber to form a stem for engagement with the valve set-screw 6″ when the stopper is unseated. It is also apparent that the stopper is adapted to have play in all directions within the flow channel but is confined at its ends by the restricted port in one direction and the restricted mouth of the shank in the other direction.

From the foregoing description it is apparent that any standard type of valve may be equipped with the hollow stopper without changing the construction of said valve, the said stopper being loosely caged within the shank of the valve casing and arranged to seat under water pressure, to thus cut off the flow of water when the master valve is lifted to an abnormal position. It is also apparent that when the master valve engages the upper port seat, the projecting head of set-screw 6″ will engage and force the plug downward a considerable distance from the valve seat 5″ in opposition to the water pressure. Hence when the master valve is partly open or full open, the movement thereof is not sufficient to permit the stopper 7 closing the water-supply port, so that a full flow of water is insured under all condition. Should it be desired to remove the valve stem for repairs, it is obvious that, by revolving said stem in the opening direction to a point where the nipple 6″ will assume a position above the plane of the valve-seat 5′, the stopper will be free to travel up under the control of the water-supply and thus positively check the flow. Hence the valve stem, together with the gland and valve-disk, can be all removed from the casing for necessary repairs, under which conditions the water will be automatically cut off.

A further advantage of my invention lies in the fact that in instances where the pressure of the water is above normal, spattering caused through the impact of the stream against the basin or other receptacle into which said stream flows will be avoided. This result is due to the fact that the stopper partially fills the flow channel, whereby the volume of water is restricted sufficiently to cause only a gentle flow from the nozzle in place of a stream under pressure that would ordinarily result.

An important feature of my invention resides in the fact that the metallic stopper is open at its lower end to permit a certain volume of water to enter and force said stopper to its seat, particular attention being also directed to the fact that the stopper head is conically peaked to form a beveled valve face and also a projecting head that is engaged by the master valve. Thus a stem for actuating said stopper is dispensed with.

I claim:

The combination with a valve including a casing, an integral inlet neck extending from the casing and having its bore reduced at its ends, a valve seat in the casing surrounding a port forming a continuation of the inner reduced bore end of the neck, and a valve engageable on said seat, a hollow cylindrical stopper member closed and engageable with the valve at its inner end and of a diameter not greater than the diameter of the outer reduced end of the said neck, and the outer end of the stopper being spread to prevent its movement past the outer end of the inlet neck.

In testimony that I claim the foregoing I have hereunto set my hand at Milwaukee in the county of Milwaukee and State of Wisconsin in the presence of two witnesses.

AUGUST ENGEL.

Witnesses:
AUGUST J. WESLE,
DAVID MUELLER.

Copies of this patent may be obtained for five cents each, by addressing the "Commissioner of Patents, Washington, D. C."